July 27, 1954  O. L. NORDIN  2,684,689
CUSHIONED EXHAUST FOR AUTOMATIC SHUTOFF VALVES
Filed Nov. 16, 1950  2 Sheets-Sheet 1

INVENTOR:
Obert L. Nordin
BY
Murray Robinson
ATTORNEY

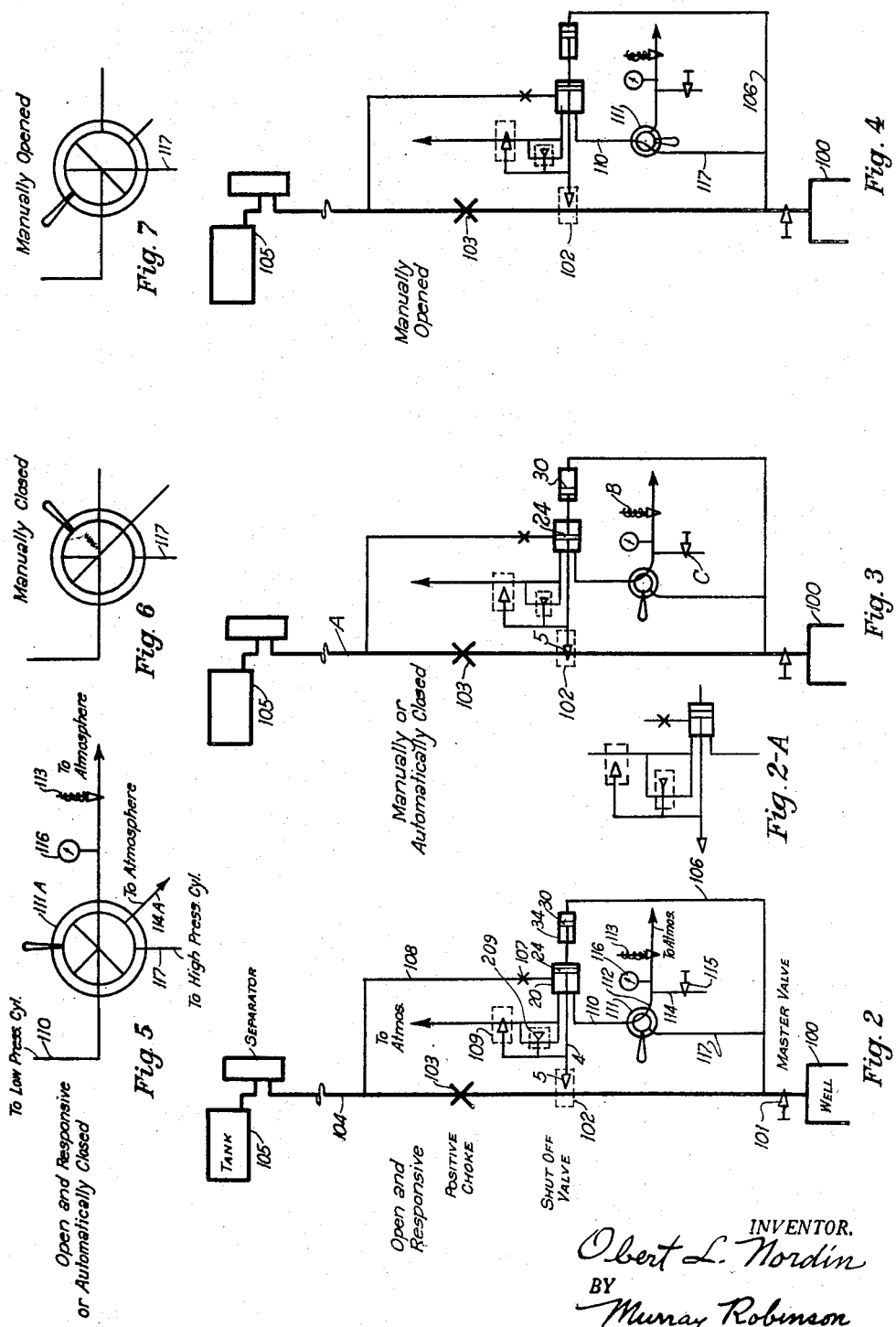

Patented July 27, 1954

2,684,689

UNITED STATES PATENT OFFICE 2,684,689

CUSHIONED EXHAUST FOR AUTOMATIC SHUTOFF VALVES

Obert L. Nordin, Houston, Tex., assignor to Thornhill-Craver Company, Inc., Houston, Tex., a corporation of Texas Application November 16, 1950, Serial No. 196,009

6 Claims. (Cl. 137—460)

This invention pertains to automatic valves and systems and more particularly to automatic shut-off valves and systems for petroleum pipe lines.

The invention herein constitutes an improvement on the valve and system disclosed in United States patent application Serial Number 79,123 filed March 2, 1949, by Homer E. Thornhill entitled "Automatic Valve and System," which application is owned by the same assignee as the present application.

It is the principal object of this invention to retard the final closing motion of the valve to prevent damage thereto when the valve core contacts its seat or other stop limiting its motion.

It is a further object of the invention to eliminate hunting on closure of the valve.

A further object of the invention is to insure easy and quick opening of the valve when the manual controls are actuated while at the same time providing for quick closure of the valve upon actuation of the automatic controls.

The foregoing and other objects and advantages of the invention will become clearer from a consideration of the disclosure of the invention following hereinafter.

Similarly to the Thornhill valve and system the present invention comprises a valve element which can replace the valve element of the usual adjustable choke or wing valve on the christmas tree just upstream from the positive choke. The valve stem passes through a packing gland and is connected to a large piston traveling in a large cylinder and beyond that to a small piston traveling in a small cylinder. The far end of the small cylinder is always connected to the upstream side of the valve and exerts a pressure tending to close the valve. The large cylinder, at a point close to the end thereof nearest the valve, is always connected through a small choke to the pipe line downstream of the valve and positive chocke. Normally the valve is open and the areas of the two pistons are so related to the upstream and downstream pressure that the valve is held open. Upon a drop in downstream pressure, however, the valve will be closed. As the valve approaches closed position an auxiliary valve in an atmospheric exhaust line leading to another port, which port is open to the interior of the large cylinder even when the large piston is at the extreme near end of the large cylinder, will open, thus further dropping the pressure in the large cylinder. Near the end of the movement the large piston itself blocks off the port leading to the downstream line so that even if the pressure should return to normal the valve would stay closed. Because of this construction, whenever the valve is closed the pressure in the large cylinder is atmospheric.

The large cylinder and large piston and the connection of the large piston to the valve element thus constitute means to open the valve, and the small piston and small cylinder and the connection of the small cylinder to the valve element constitute means to close the valve. Although in the preferred embodiment of the invention the same valve stem connects both pistons to the valve element and all three are rigidly connected together, as pointed out in the hereunto annexed claims it is sufficient if the valve opening and closing means are interlocked by associating the pistons and valve element so that movement of any one of the three at least tends to move one of the others.

According to the present invention, there is added to the foregoing combination a means to vary the resistance to flow of the atmospheric exhaust line so as to increase the resistance as the valve approaches closed position and after the closure of the port leading to the downstream line. This can be done in a variety of ways but as hereinafter described in detail has been accomplished by dividing the exhaust line into parallel branches between the cylinders and the auxiliary valve and placing a supplementary valve in one of the branches to close off the one branch when it is desired to restrict flow. The supplementary valve, like the auxiliary valve, is actuated by movement of the main valve.

Again as in the Thornhill application, the valve and system of the present invention include a connection of the extreme near end of the large cylinder through a manually operated three-way valve to another atmospheric exhaust line. The latter is normally closed by a pop valve set to open at a predetermined pressure. Upon an excessive increase in the downstream pressure the pop valve will open causing a drop in pressure in the large cylinder and the main valve will close the same as though there were a drop in the downstream pressure. The small choke in the line from the pipe line to the large cylinder insures that there will be a sufficient drop in pressure in the large cylinder under these conditions.

A hand operated bleeder valve controls a branch line from the line controlled by the pop valve. If it is desired to close the main valve the bleeder valve is opened, which drops the pressure in the large cylinder the same as if the pop valve had opened.

If it is desired to open the main valve, which must always be done manually, the above-mentioned three-way valve is turned so as to connect the large cylinder to a line from the upstream side of the main valve instead of the pop valve controlled atmospheric exhaust line. This brings the pressure in the large cylinder up nearly to that in the small cylinder, the other lines leading from the large cylinder being small enough to serve as chokes, so that the force of the small cylinder is overbalanced and the valve opened. Returning the three-way valve to its previous position makes the system responsive again, in which condition any excessive drop in pressure in the large cylinder will cause it to close. Such a drop may occur in any of three ways: manual opening of the bleeder valve, automatic opening of the pop valve on excessive pressure, or breakage of the downstream line causing an excessive drop in pressure. A pressure gauge is also connected to the exhaust line leading to the pop valve from the large cylinder. If the gauge shows that there is pressure in the cylinder, it indicates the main valve is open. If the gauge shows atmospheric pressure, the main valve is closed.

For a detailed description of the invention reference will now be had to the accompanying drawings, wherein:

Figures 2, 2A, 3 and 4 are schematic drawings of the valve control system showing the valve in open and responsive, partially closed, closed, and manually opened positions, respectively; and Figures 5, 6, and 7 show a four-way valve suitable for use in the system.

Figure 1:
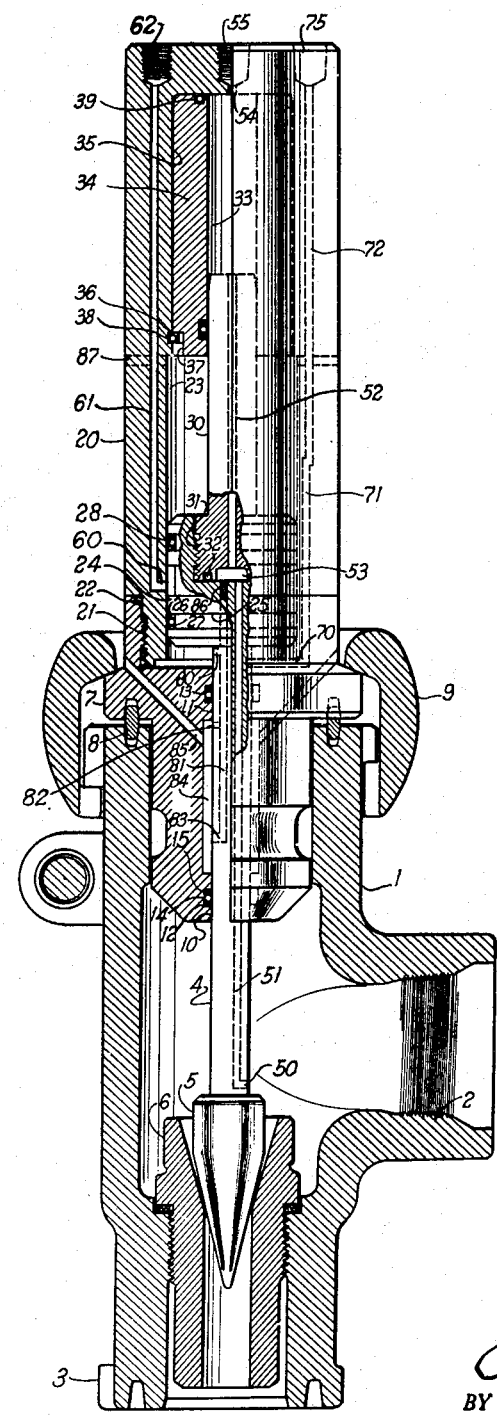
Figure 1 is a section taken along the axis of the valve.

Referring now to Figure 1, the valve comprises a valve body 1 having a threaded inlet 2 adapted to be connected to a side arm of a christmas tree manifold. The valve body also has a flanged outlet 3 adapted to be connected to a positive choke from which leads the pipe line going to the storage tank. The valve body is in the shape of a T, the inlet 2 being at the base of the T, and the outlet 3 being in one of the arms of the T. Through the other arm of the T projects a valve stem 4 on which is mounted the valve 5 which cooperates with a removable valve seat 6 threadedly supported within the outlet 3. The valve stem 4 is slidably supported within the center of the arm of the T opposite the outlet by means of a flanged valve bonnet 7. The valve bonnet is sealed to the end of the valve body by means of a steel ring gasket 8 and is secured thereto by means of a fast coupling 9.

The valve bonnet is provided with two cylindrical bearings 10 and 11 for supporting the cylindrical valve stem 4. Within each of the two annular grooves 12 and 13 within the bearings 10 and 11 there is mounted a neoprene O ring such as that shown at 14 disposed between a pair of leather non-extrusion rings such as that shown at 15. These form a pair of spaced sliding seals between the valve stem 4 and the valve bonnet 7.

An actuating cylinder 20 is connected to the outer end of the valve bonnet 7 by means of screw thread 21 and is sealed thereto with a neoprene O ring 22. The cylinder is provided with a large bore 23 within which slides cylindrical piston 24 connected to the outer end of the valve stem 4. Within an annular groove 25 on the periphery of the piston 24 is disposed a neoprene O ring 26. The O ring is placed between two leather non-extrusion rings, such as that shown at 27. These rings form a seal between the piston and the cylinder walls. Similar O rings and non-extrusion rings placed in a second annular groove 28 in the periphery of the piston 24 provide a second sliding seal between the piston and cylinder walls.

A small piston 30 is threadedly connected at 31 within an aperture in the end of piston 24 opposite the valve stem and is sealed thereto by means of a neoprene O ring 32. Cylindrical piston 30 travels within cylindrical bore 33 in a small cylinder 34 telescoped within counterbore 35 in the end of cylinder 20 farthest from the valve bonnet. Cylinder 34 is held in place in the end of cylinder 20 by means of a snap ring 36 placed over the reduced end 37 of cylinder 34 and expanded into annular groove 38 within the end of counterbore 35. Cylinder 34 is sealed to cylinder 20 by means of O ring 39. An O ring and two leather non-extrusion rings placed in annular groove within the bore 33 of cylinder 34 provide a sliding seal between the small piston 30 and the small cylinder walls 33. This construction makes it possible to adapt the valve and control system to a particular set of operating pressures corresponding to a particular well and pipe line by changing the size of the high-pressure cylinder without having to change the rest of the valve control mechanism. It is only necessary to select the desired size cylinder 34 and lock it in place in the end of cylinder 20 and select a piston 30 to fit the cylinder 34 and screw it in place in the end of piston 24.

The valve stem 4 is provided with radial and axial bores 50 and 51 and piston 30 is provided with an axial bore 52. These, together with space 53 between the socket in large piston 24 and the screw plug end of small piston 30, form a continuous passage from the upstream or high-pressure portion of the interior of the valve body 1 to the interior of the small or high-pressure cylinder 34. A port 54 in the end of the cylinder 20 and a screw socket 55 therein provide a passage from the interior of the small or high-pressure cylinder to the manually operated three-way valve. These internal passages through the valve eliminate the necessity for tapping into the christmas tree in order to connect to the high-pressure fluid in the well which is used for urging the valve to closed position. It also reduces to a minimum the amount of high-pressure tubing needed for the control system.

A radial port 60 and a longitudinal passage 61 connect the interior of the large or low-pressure cylinder 20 to a screw socket 62 in the end of the cylinder body 20 adapted to receive a small choke plug. The other side of the choke plug will be connected through a control line to the pipe line on the downstream or low-pressure side of the positive choke. If desired the choke may be a small hole drilled in the body rather than being added as an accessory or the port 60 and passage 61 may be small enough to serve as a choke themselves. However, the removable choke makes the apparatus more adaptable to changed operating pressures.

As shown in the drawings, when the valve is in the closed position the piston 24 blocks off the end of passage 60, thereby preventing the low-pressure fluid from the pipe line getting between the piston 24 and the end of the cylinder 20 nearest the valve. When the valve is opened a small amount the port 60 is uncovered and admits low-pressure fluid to this space so as to urge the valve towards its open position. Thus port 60 and piston 24 constitutes a secondary valve means for controlling fluid flow in the low-pressure control line. Under normal conditions the force exerted by this low-pressure fluid on piston 24 is greater than the force exerted by the high-pressure fluid on the end of piston 30, so that the main valve stays open.

Radial passage 70 and longitudinal passages 71 and 72 in the walls of the cylinder 20 provide a connection from the operating space in the low-pressure cylinder between piston 24 and the end of the cylinder nearest the valve to a screw socket 75 in the end of cylinder body 20. A screw plug in the socket 75 will connect these passages to a control pipe leading to the three-way valve. In the normal position of the three-way valve, the control pipe will in turn be connected to another control pipe leading to the manual bleed valve, the pressure gauge, and the excess-pressure pop valve. The pop valve is constructed to reclose at a lower pressure than that at which it opens. If the bleed valve should be manually opened, or if the pop valve should open because of excessive pressure in the pipe line downstream from the positive choke, the pressure in the operating space of the low-pressure cylinder will fall, permitting the valve to be closed by the high-pressure fluid in the small cylinder. The same thing would occur if there should be a fall in pressure in the pipe line due to breakage or other cause. The pressure gauge indicates the position of the valve.

A radial port 80, a longitudinal bore 81, a second radial port 82, which may be larger than port 80, and a third radial port 83 connect the operating space of the low-pressure cylinder to an annular space 84 within the valve bonnet 7 between the bearings 10 and 11. A passage 85 connects space 84 to atmosphere. In order to drill the bore 81, it is continued through to the end of piston 24 opposite the valve. The end of the passage is blocked off afterwards, with weld metal, as indicated at 86. If desired, a tapered pin could be driven in to close the passage instead.

When the valve is in its normal or open position, the end of port 83 will be blocked off by bearing 11. Whenever the valve moves a short distance toward its closed position, due to any of the previously mentioned causes, the port 83 will be opened, allowing the low-pressure fluid in the operating space of cylinder 20 to exhaust to atmosphere. The port 83 and bearing 11 constitute the auxiliary valve actuated by the main valve referred to in the introductory description.

At the start of the main valve toward closed position, the low-pressure fluid in the operating space of cylinder 20 can bleed off or exhaust through both of the parallel branch passages provided by ports 80 and 82. Port 82 is made large enough to provide together with port 80 a large opening for the escape of the low-pressure fluid so that the initial closing movement of the valve will be rapid. The port 82 is so placed that when the valve is nearly closed, the port 82 will be blocked off by bearing 11. Bearing 11 and the mouth of port 82 constitute a supplementary valve controlling the branch exhaust passage constituted by port 80. Closure of this supplementary valve leaves open only the passage provided by port 80. The port 80 is drilled to the proper size to prevent the low-pressure fluid from exhausting too fast. This keeps the valve from slamming shut. If desired a removable choke plug could be used here to adapt the apparatus to different operating pressures.

Port 82 is so disposed that it will not be blocked off by bearing 11 upon movement of the valve toward closed position until after the piston 24 blocks off port 60. This insures that a maximum opening is available for exhaust of the fluid beneath piston 24 through both ports 80 and 82 until after the space beneath the piston is cut off from the low-pressure side of the petroleum pipe line. If this were not the case, the valve might try to reopen before it was fully closed, followed by a hunting motion of the valve between open and closed positions.

Although only one additional port 82 has been shown, other ports can be provided at intervals along the stem, or a continuous slot can be made in the side of the stem. Also, the size of the various ports, slots, and openings can be varied. These factors are selected to produce the desired operating characteristics. Summarizing, such opening or openings provide means to vary the resistance or size of the exhaust passage in accordance with the position of the valve and its stem.

Because of the fact that the large cylinder 20 also houses the small cylinder 34, there is a possibility that despite the seals between the cylinders and the pistons operating therein fluid under pressure may leak into the space between the large piston 24 and the inner end of the small cylinder 34. Such an accumulation on the backside of piston 24 would render the system and valve inoperative. To prevent this from happening, the cylinder 20 is provided with one or more vents such as the radial bore 87.

Assuming the valve to be in the closed position as shown in the drawings, if it desired to open the valve this can be accomplished by connecting the pipe from the socket 55 with the control pipe from the socket 75. This can be done by changing the position of the three-way valve. This admits high-pressure fluid to the operating space of the low-pressure cylinder, thereby overcoming the force in the high-pressure cylinder tending to keep the valve closed. The exhaust passage 81 from the low-pressure cylinder to atmosphere is of sufficiently small size so that enough pressure can build up in the low-pressure cylinder under these conditions to open the valve. After the valve has been opened the three-way valve is returned to its original position, in which the control pipe connected to the socket 55 is closed off and the control pipe connected to the socket 75 is in communication with the pop valve.

Referring now to Figure 2, there is shown a schematic representation of a well and pipe line system, together with the automatic shut-off valve and the control system therefor. The main pipe line system is shown in heavy lines. The control lines leading to the shut-off valve are shown in light lines. The well 100 is connected through master valve 101 of the christmas tree to automatic shut-off valve 102. The outlet of shut-off valve 102 leads to positive choke 103, which, in turn, is connected to the pipe line 104 leading to a suitable separator and thence to storage tank 105.

The control system comprises high-pressure control line 106 leading from the high-pressure side of the positive choke to the high-pressure cylinder 34. (In the construction shown in Figure 1, the high-pressure line 106 is constituted by the passages 50, 51 and 52 through the valve stem and pistons.) The low-pressure cylinder 20 is connected through a small choke 107 and low-pressure control line 108 to the low-pressure side of the positive choke 103. The extreme end of low-pressure cylinder 20 is connected to atmosphere through auxiliary valve 109. (In the construction shown in Figure 1 the auxiliary valve 109 is constituted by the port 83 in the valve stem and the bearing 11 for the valve stem.) The extreme end of the low-pressure cylinder 20 is also connected through control line 110 and three-way valve 111 to an exhaust line 112. The exhaust line 112 is normally closed by a pop valve 113. Also connected to exhaust line 112 is a bleed line 114 controlled by a manual valve 115. A pressure gauge 116 is also connected to the exhaust line 112. The third port in the three-way valve is connected through control line 117 to the high-pressure control line 106.

In accordance with the present invention, the connection between the extreme end of the low-pressure cylinder 20 and the auxiliary valve 109 includes parallel branch passages, one of which is controlled by supplementary valve 209. (In the construction shown in Figure 1 the supplementary valve 209 is constituted by the mouth of port 82 and bearing 11.)

In Figure 2 the control system and valve are shown in the open and responsive position. The auxiliary valve 109 is closed, the secondary valve 60—24 is open, and the supplementary valve 209 is open. Should there be a drop in pressure in the low-pressure line for any reason, such as a break in the line or should excess pressure in the low-pressure line cause pop valve 113 to open, the drop in pressure beneath piston 24 will cause the main valve to start to close. After a slight initial motion the apparatus reaches the position shown in Figure 2A in which the auxiliary valve 109 has opened and since supplementary valve 209 is still open the pressure beneath piston 24 bleeds off rapidly. Just before the main valve closes, and after the secondary valve has closed, the supplementary valve 209 closes as shown in Figure 3. Thereafter the main valve slowly comes to full closed position.

Figure 4 illustrates how the valve may be reopened manually by changing the position of the three-way valve 111 so as to connect the control line 110 from the low-pressure cylinder through the control line 117 to the high-pressure control line 106. After the valve has been reopened, the three-way valve 111 is returned to the position shown in Figure 2 to render the system responsive.

If desired the three-way valve 111 and the manual valve 115 can be combined into a single four-way valve 111A shown in Figure 5. As shown the valve is in normal position connecting line 110 to pop valve controlled exhaust line 112. Turning the valve to the right as shown in Figure 6 connects line 110 to atmospheric bleed line 114A to manually close the main valve while keeping the high-pressure line 117 shut off. At the same time the connection to the pop valve controlled line 112 preferably stays open to insure that the gauge pressure drops to atmospheric to show that the valve is closed. Turning the valve to the left as shown in Figure 7 connects line 110 to high-pressure line 117 to manually open the valve while shutting off the pop valve controlled exhaust line 112 and the atmospheric bleed line 114A.

When a well is first brought in it may be desired to use an adjustable choke to determine the size choke needed for a given flow. The adjustable choke may comprise a manually operated valve disposed in the valve body 2 replacing the automatic valve shown in Figure 1. After the desired size choke has been determined, the proper size flow bean may be placed in the positive choke 103 shown in Figures 2, 3 and 4. Then, with the master valve 101 still shut off, the fast coupling 9 between the valve body 2 and the adjustable choke valve can be released, the adjustable choke valve replaced with the automatic valve, and the fast coupling replaced as shown in Figure 1. Thereafter reopening the master valve 101 will place the system into production.

While a preferred embodiment of the invention has been illustrated and described, it is obvious that many modifications thereof could be made by one skilled in the art without departing from the spirit of the invention. It is desired to protect by Letters Patent all forms of the invention falling within the scope of the appended claims.

I claim:

1. A pressure control apparatus comprising a valve member adapted to be placed in a hollow valve body having an inlet and an outlet connected in a pipe line, said valve member being adapted in one position to close the passage through said body and in another position to open said passage, closing means for moving the valve member to closed position including an expansible chamber having a movable wall, opening means for moving said valve member to open position comprising an expansible chamber having a movable wall, the first said wall being of smaller area than the second said wall, means associating the two said walls and said valve member to cause movement of each of the three to at least tend to move at least one of the others and to at least tend to move the valve upon movement of at least one of said walls with the movement of each wall upon expansion of the chamber of which it is a part opposing like movement of the other wall, means for connecting the first said chamber to said pipe line on the upstream side of said valve member, means for connecting the second said chamber to the pipe line on the downstream side of said valve member, relief means for connecting the second said chamber to atmosphere, and auxiliary valve means in said relief means interlocked with said movable wall of the second said chamber, said auxiliary valve means closing said relief means when the last said movable wall is in position corresponding to open position of said valve member and opening said relief means when the last said movable wall has moved away from its last said position, and means for varying the resistance to fluid flow of said relief means in accordance with the position of said movable wall of the second chamber after said auxiliary valve means has opened.

2. The combination of claim 1 in which the initial resistance to fluid flow through said relief means after the auxiliary valve has opened is less than the final resistance just as said valve member closes said passage through said body.

3. A pressure control apparatus comprising a valve member adapted to be placed in a hollow valve body having an inlet and an outlet connected in a pipe line, said valve member being adapted in one position to close the passage through said body and in another position to open said passage, closing means for moving the valve member to closed position including an expansible chamber having a movable wall, opening means for moving said valve member to open position comprising an expansible chamber having a movable wall, the first said wall being of smaller area than the second said wall, means associating the two said walls and said valve member to cause movement of each of the three to at least tend to move at least one of the others and to at least tend to move the valve upon movement of at least one of said walls with the movement of each wall upon expansion of the chamber of which it is a part opposing like movement of the other wall, means for connecting the first said chamber to said pipe line on the upstream side of said valve member, means for connecting the second said chamber to the pipe line on the downstream side of said valve member, relief means for connecting the second said chamber to atmosphere, and auxiliary valve means in said relief means interlocked with said movable wall of the second said chamber, said auxiliary valve means closing said relief means when the last said movable wall is in position corresponding to open position of said valve member and opening said relief means when the last said movable wall has moved away from its last said position, said relief means including a plurality of parallel branch passages between said second chamber and said auxiliary valve means, and a supplementary valve controlling one of said passages interlocked with said movable wall of the second said chamber.

4. The combination of claim 3 in which the supplementary valve is normally open and closes only when said valve member approaches close to the position in which it closes said passage through said body.

5. A pressure control apparatus comprising a valve member adapted to be placed in a hollow valve body having an inlet and an outlet connected in a pipe line on the high-pressure side of a choke, said valve member being adapted in one position to close the passage through said body and in another position to open said passage, closing means for moving the valve member to closed position including an expansible chamber having a movable wall, opening means for moving said valve member to open position comprising an expansible chamber having a movable wall, the first said wall being of smaller area than the second said wall, means associating the two said walls and said valve member to cause movement of each of the three to at least tend to move at least one of the others and to at least tend to move the valve upon movement of at least one of said walls with the movement of each wall upon expansion of the chamber of which it is a part opposing like movement of the other wall, means for connecting the first said chamber to said pipe line on the upstream side of said valve member, means for connecting the second said chamber to the pipe line on the downstream side of said choke, secondary valve means controlling the last said means closing the connection when the movable wall of the second said chamber is in position corresponding to closed position of said valve member and opening the connection when the last said wall has moved away from its last said position, relief means for connecting the second said chamber to atmosphere, and auxiliary valve means in said relief means interlocked with said movable wall of the second said chamber, said auxiliary valve means closing said relief means when the last said movable wall is in position corresponding to open position of said valve member and opening said relief means when the last said movable wall has moved away from its last said position, said relief means including a plurality of parallel branch passages between said second chamber and said auxiliary valve means, and a supplementary valve controlling one of said passages interlocked with said movable wall of the second said chamber, said supplementary valve being normally open and closing on movement of said valve member toward closed position only after said secondary valve means has closed.

6. A valve comprising a valve body having a flow passage therethrough providing an inlet and an outlet, a valve member therein adapted in one position to close the passage and in another to open the passage, means to open and close the valve comprising a valve stem connected to said member, a large piston connected to the valve stem, a small piston connected to the valve stem, a large cylinder around the large piston, a small cylinder around the small piston, means connecting the large cylinder to the valve outlet to tend to open the valve, means connecting the small cylinder to the valve inlet to tend to close the valve, relief means for connecting the large cylinder to atmosphere, and means connected to said valve stem to vary the resistance to fluid flow through said relief means in accordance with the position of said valve stem from a maximum when said valve is open through a minimum when said valve is partially open to an intermediate value when said valve is closed.

References Cited in the file of this patent

UNITED STATES PATENTS

| Number | Name | Date |
|---|---|---|
| 2,418,743 | Baker | Apr. 8, 1947 |